United States Patent [19]

Kanamori et al.

[11] Patent Number: 4,742,987
[45] Date of Patent: May 10, 1988

[54] VALVE

[75] Inventors: Shozo Kanamori, Chigasaki; Shigehiro Kawai, Kanagawa; Seiji Yamaki, Kamakura, all of Japan

[73] Assignee: Yamatake-Honeywell Co. Ltd, Tokyo, Japan

[21] Appl. No.: 43,570

[22] Filed: Apr. 28, 1987

Related U.S. Application Data

[63] Continuation of Ser. No. 801,669, Nov. 25, 1985, abandoned, which is a continuation-in-part of Ser. No. 629,521, Jul. 10, 1984, abandoned.

[51] Int. Cl.[4] ............................................. F16K 25/00
[52] U.S. Cl. ..................................... 251/123; 251/326
[58] Field of Search ........................ 251/123, 124, 326

[56] References Cited

U.S. PATENT DOCUMENTS 3,180,360 4/1965 Paulin .................................. 251/124
4,311,166 1/1982 De Feo ................................ 251/124

FOREIGN PATENT DOCUMENTS 1379675 1/1975 United Kingdom ................ 251/326

Primary Examiner—Samuel Scott
Assistant Examiner—H. A. Odar
Attorney, Agent, or Firm—Mitchell J. Halista; Albin Medved

[57] ABSTRACT

A valve having a flow path in the form of a Venturi tube having a throttle and flow path sections extending and flaring from the opposite sides of the throttle to an inlet and outlet, respectively, and a cylindrical valve plug provided at the throttle and selectively movable at right angles to the flow path to present a flow path end into the flow path and having a semi-spherical valve head at the flow path end with a notch having a length in the direction of movement of the valve plug less than the diameter of the throttle formed in a portion of the valve head and the remaining portion of the valve head containing a diametrical line connecting opposite portions of the valve head in contact with the wall of the throttle while occupying a major portion of the surface of the valve head facing a flow in the flow path.

10 Claims, 4 Drawing Sheets

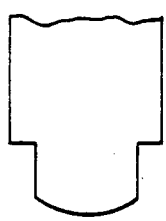 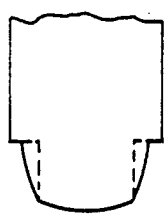 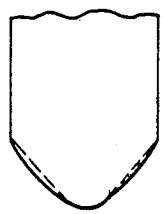 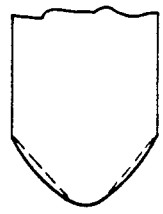
FIG.5A     FIG.6A     FIG.7A     FIG.8A
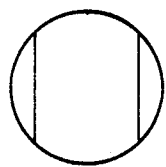 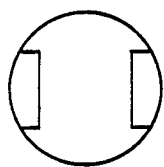 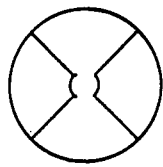 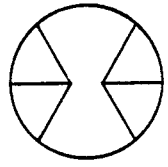
FIG.5B     FIG.6B     FIG.7B     FIG.8B
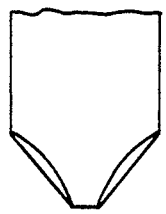 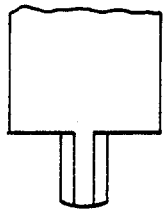 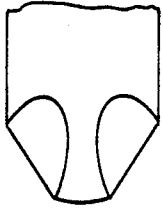 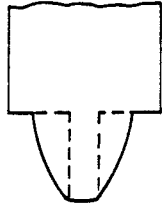
FIG.9A     FIG.10A    FIG.11A    FIG.12A
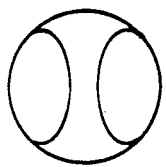 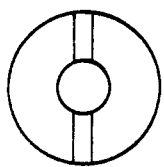 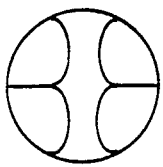 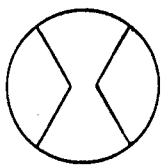
FIG.9B     FIG.10B    FIG.11B    FIG.12B

VALVE

This application is a continuation of application Ser. No. 801,669, now abandoned filed 11/25/85, which is a continuation-in-part of application Ser. No. 629,521 filed 07/10/84, now abandoned.

BACKGROUND OF THE INVENTION

1. Field of the Invention

This invention relates to a valve for flow control and, more particularly, to a valve having a flow path offering low resistance against flow and including an improved plug.

2. Description of the Prior Art

There exist valves of the type wherein the flow therethrough is controlled by a cylindrical plug having a semi-spherical valve head which is driven back and forth at right angles with respect to a Venturi tube type inner flow path. Such a valve has an inherent substantial shortcoming in that there occurs an inversion phenomenon in its flow characteristic during its opening and closing operations, particularly in the valve opening range immediately before the full opening. This unstable characteristic of the valve seriously degrades its reliability when using it as a control valve.

SUMMARY OF THE INVENTION

An object of the invention is to provide an improved valve having a flow characteristic which is free from any inverted slope portion and is stable and less susceptible to the influence of pressure or the like.

In accomplishing this and other objects, there has been provided, in accordance with the present invention, a valve having a flow path in the form of Venturi tube having a throttle and flow path sections extending and flaring from the opposite sides of the throttle to an inlet and outlet, respectively, and a cylindrical valve plug provided at the throttle and selectively movable at right angles to the flow path and having an end in the flow path with a semi-spherical valve head with a notch formed in a portion of the valve head to provide a depressed surface normal to the axial direction of the flow path and having a length in the direction of movement of the valve plug less than the diameter of the throttle while occupying a major portion of the surface of the valve head facing a flow in the flow path.

BRIEF DESCRIPTION OF THE DRAWINGS

A better understanding of the present invention may be had when the following description may be had when the following description is read in connection with the accompanying drawings, in which.

DESCRIPTION OF THE PREFERRED EMBODIMENT

In the prior art valves using a Venturi tube type flow path, the stream is throttled in a central throttle where a plug is provided that proceeds through the flow path section, either uniformly over the sectional area of the flow path or partially on one side wall of the flow path. It has been found that where these two situations occur alternately it is difficult to obtain accurate flow control with the difficulty being most pronounced in the neighborhood of 85% of the maximum plug lift. A presumable cause for this is that the complicated configuration of the wall of the flow path that is formed when the semi-spherical valve plug is advanced into the flow path has undesired flow effects.

Figure 1:
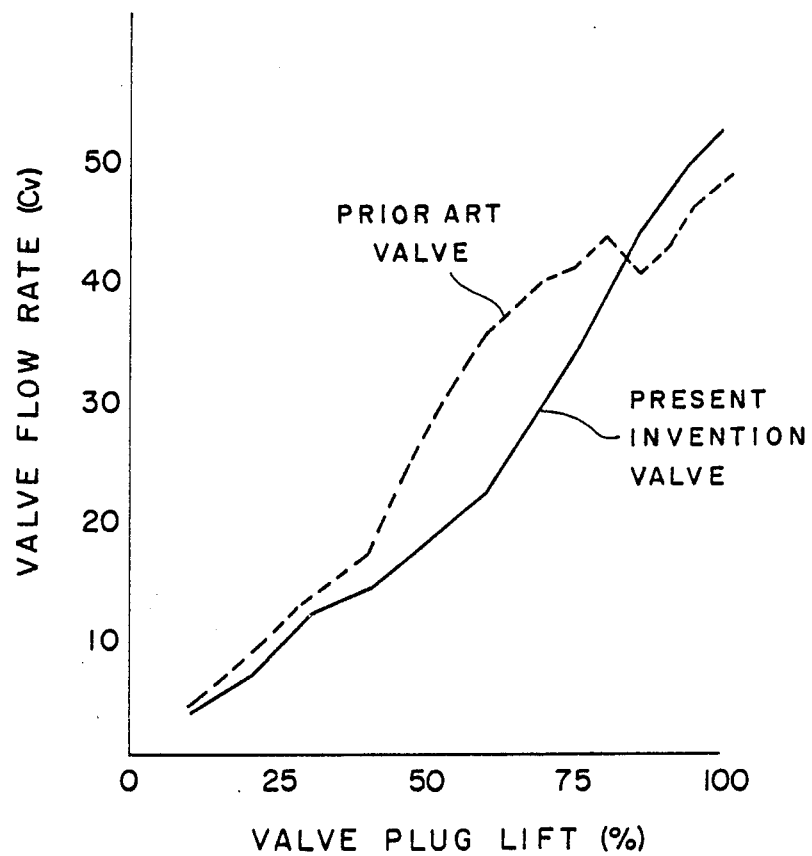
FIG. 1 is a graph showing flow characteristics of a prior art valve and a valve according to the present invention.

This characteristic is shown in detail in FIG. 1, in which a dashed curve represents the flow rate of the prior art valve, e.g., a valve having a fluid inlet and outlet with a diameter of five centimeters, plotted against the lift amount of the plug (referred to as lift hereinafter). It will be seen from the graph that there is an inverted slope portion in the lift range of 80 to 85%. Further, it has been found that the position and the amount of the inversion vary with the pressure difference across the valve as well as with the Reynolds number of the fluid whereby the valve characteristic is unstable.

According to the present invention a pocket-like space is provided on an upstream or downstream side portion of the complicated configuration part of the wall of the flow path. The pocket-like space suppresses or buffers a vortex flow that would occur without any pocket-like space when the stream proceeds past the complicated configuration part of the flow path. The effect of this space reduces the inverted slope portion and improves the flow characteristic of the valve. In FIG. 1, a solid curve shows a flow characteristic obtained in accordance with the present invention.

The effects obtainable are slightly different in the case when the pocket-like space is provided on the upstream side of the plug when compared to the case when it is provided on the downstream side. In the former case, the capacity, i.e., the Cv value, of the valve can be increased as well as eliminating the inversion phenomenon. In the latter case, the sole effect obtainable is the elimination of the inversion phenomenon.

Figure 2:
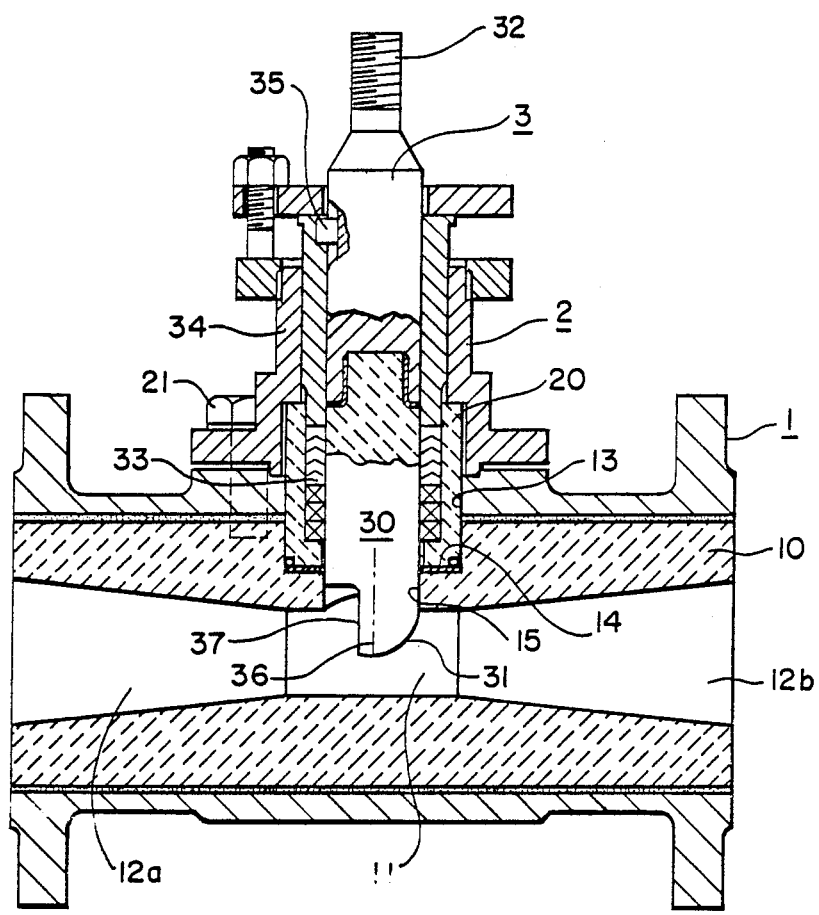
FIG. 2 is a sectional view showing an embodiment of the invention.
Figure 3:
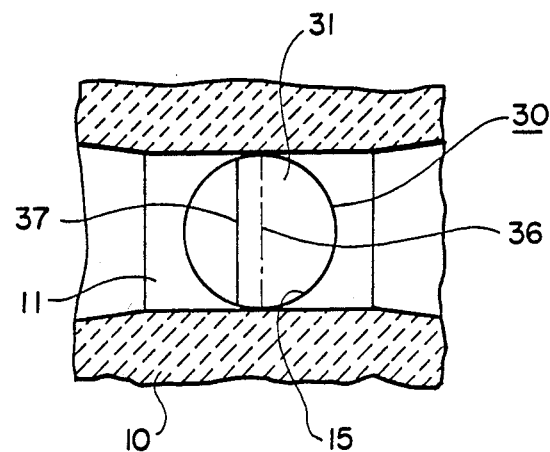
FIG. 3 is a fragmentary bottom view of the valve plug shown in FIG. 3.

FIG. 2 is a sectional view showing an embodiment of the valve according to the invention, and FIG. 3 is a fragmentary bottom view of the plug shown in FIG. 2. Referring to these Figures, the illustrated valve includes a valve body 1, a cap 2 and a plug 3. A liner 10, e.g., rubber, is fitted in the valve body 1 and is bonded thereto. The valve bore includes a central throttle section 11 and flaring sections 12a and 12b coaxially extending and flaring from the opposite sides of the throttle section 11 toward a fluid inlet and outlet, respectively, with the bore constituting a Venturi tube type flow path. The length of the throttle 11 may be set to any desired value.

The cap 2 surrounds a stuffing member 20 and is secured to the outer periphery of the valve body 1 by clamping bolts, e.g., bolt 21, screwed through it into the valve body 1. The member 20 is coaxially located within an opening or hole 13 formed in the valve body 1, and its inner end or bottom is seated in a sealing relation on a seat 14 formed in a recessed side portion of the liner 10. The plug 3 penetrates a control hole 15 formed in a side portion of the liner 10 as well as the hole 13. The plug 3 has a valve head 30 having a semispherical end 31 at one end, with the end 31 being arranged to enter the flow path through the central throttle section 11 and a coupling thread 32 formed at the other end for coupling the plug 3 to a plug driving means (not shown). The plug 3 is received in a central hole of the cap 2 and is supported therein in a liquid-tight fashion by a gland/packing 33 and a gland/packing follower 34. The gland/packing follower 34 has a key 35 secured thereto with the key 35 cooperating with a longitudinal slot in the plug 3 so that the plug 3 can only be axially moved back and forth without being rotated by a driving force applied to the coupling thread 32. The liner 10, stuffing member 20 and valve head 30 may be made of selected materials correlated to any special fluid carried by the valve.

Figure 4:
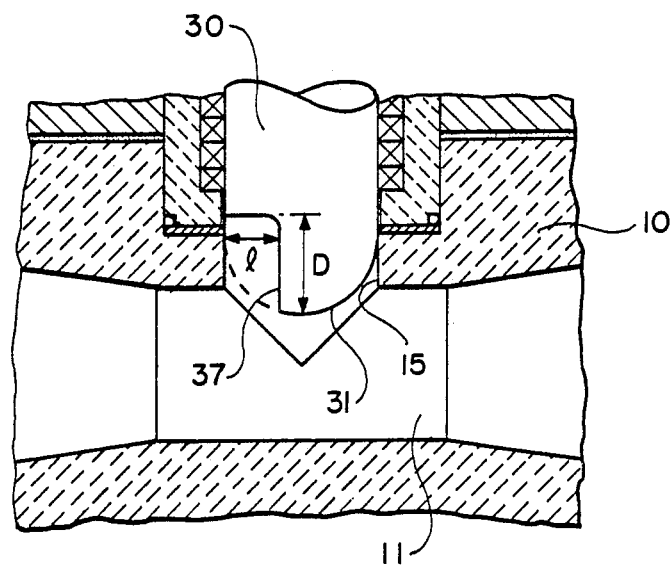
FIG. 4 is a partial showing of the embodiment of the valve of FIG. 2 in a full open position and FIGS. 5 to 12 (A-B) are pictorial side and bottom views of the valve plug showing modifications of the embodiment shown in FIG. 2.

In this embodiment, the end 31 of the valve head 30 is formed with a notch 37 having a depressed surface normal to the axial direction of the flow path. The notch 37 defines a pocket-like space or recess communicating with the flow path through the throttle 11 during a movement of the plug from a valve closed state to a state where the valve is substantially fully opened. FIG. 4 illustrates the dimensions of the notch 37. In general, its width or dimension "l" in the axial direction of the flow path should not exceed one half of the diameter of the plug 3 to ensure that the remaining portion of the end 31 contains a diametrical line 36 connecting opposite portions thereof in contact with the wall of the flow path as shown in FIG. 3. On the other hand, the face of the notch 37 should extend across, i.e., occupy, a major portion of the surface the flow path end 31 of the plug 3 facing a flow in the flow path. Its length "D" should be greater than one half of the diameter of the plug 3 and less than the diameter of the throttle in order to obtain a satisfactory effect. The width "l" and length "D" are in such a relation to each other that if the former is large enough the latter may be correspondingly small and vice versa. Without the notch, a complicated configuration is defined in the control hole 15, i.e., a configuration of a dome as shown by a dashed line, which has, as discussed above, undesired effects on the flow through the flow path. Accordingly, the notch 37 is provided to eliminate the noted undesired effects, and it should be large enough to eliminate those undesired effects.

FIGS. 5 to 12 show examples of various modifications of the end of the valve head of the plug 3 according to the invention. While these examples have notches formed on both the upstream and downstream sides of the valve head end, it should be noted that a single notch formed on either side of the valve head may suffice depending on specifications of the valve. Further, the notches may be of different shapes on the upstream and downstream sides of the valve head.

Accordingly, it may be seen that there has been provided, in accordance with the present invention, an improved valve having a flow characteristic which is free of any inverted slope portion.

The embodiments of the invention in which an exclusive property or privilege is claimed are defined as follows:

1. A valve comprising
   a flow path in the form of a Venturi tube having a central throttle and flow path sections flaring from the opposite sides of said throttle to an inlet and outlet, respectively,
   a plug guide means attached to said throttle by a fluid-tight seal and having a uniform diameter internal bore for guiding a cylindrical plug and for providing a fluid-tight seal with the plug during an entire movement of the plug in said guide means and
   a cylindrical uniform diameter plug provided in said throttle and said bore in said guide means and selectively movable at right angles to said flow path, said cylindrical plug having an end in said flow path with a semi-spherical valve head with a notch formed in a portion of said valve head to provide a surface at the bottom of said notch normal to the axial direction of said flow and having a length starting at an end of said valve head in said flow path which is less than the diameter of said throttle section while occupying a major portion of the surface of said valve head facing a flow in said flow path whereby a flow rate stabilization in said flow path is produced by said notch in said valve head by eliminating an inversion in the flow rate during opening and closing operations of the valve to provide a reliable and precise flow quantity.

2. A valve as set forth in claim 1 wherein the remaining portion of said valve head contains a diametrical line connecting opposite portions of said valve head in contact with the wall of said throttle.

3. A valve as set forth in claim 1 wherein said notch is formed on one side of said valve head.

4. A valve as set forth in claim 3 wherein said notch is formed on an upstream side of said valve head.

5. A valve as set forth in claim 3 wherein said notch is formed on a downstream side of said valve head.

6. A valve as set forth in claim 1 wherein said notch is formed on the upstream and downstream side of said valve head.

7. A valve as set forth in claim 6 wherein said upstream and downstream notches are substantially identical.

8. A valve as set forth in claim 6 wherein said upstream and downstream notches are different in configuration.

9. A valve as set forth in claim 1 wherein said notch has a width in an axial direction of the flow path through said Venturi tube which is less than one-half of the diameter of said plug.

10. A valve as set forth in claim 9 wherein the length of the notch in an axial direction of said plug is greater than one-half the diameter of said plug.

* * * * *